United States Patent
Wirola et al.

(10) Patent No.: US 7,965,232 B2
(45) Date of Patent: Jun. 21, 2011

(54) ASSISTANCE DATA PROVISION

(75) Inventors: Lauri Wirola, Tampere (FI); Ismo Halivaara, Tampere (FI)

(73) Assignee: Nokia Corporation, Espoo (FI)

( * ) Notice: Subject to any disclaimer, the term of this patent is extended or adjusted under 35 U.S.C. 154(b) by 775 days.

(21) Appl. No.: 11/726,735

(22) Filed: Mar. 21, 2007

(65) Prior Publication Data

US 2008/0234980 A1    Sep. 25, 2008

(51) Int. Cl.
*G01S 19/05* (2010.01)
(52) U.S. Cl. .......... 342/357.42; 342/357.64; 342/357.66
(58) Field of Classification Search ................. 455/12.1; 342/357.2, 357.21–357.25, 357.42, 357.64, 342/357.66
See application file for complete search history.

(56) References Cited

U.S. PATENT DOCUMENTS

| 7,498,980 B2 * | 3/2009 | Kagawa et al. ........... 342/357.04 |
| 2003/0181161 A1 * | 9/2003 | Harles et al. ................. 455/12.1 |
| 2005/0136836 A1 * | 6/2005 | Karabinis et al. ............ 455/12.1 |
| 2006/0040631 A1 * | 2/2006 | Tso et al. ....................... 455/255 |
| 2007/0057839 A1 | 3/2007 | Kagawa |

FOREIGN PATENT DOCUMENTS

| WO | WO 2006/043123 | 4/2006 |
| WO | PCT/IB2006/051714 | 5/2006 |
| WO | PCT/IB2006/053366 | 9/2006 |

OTHER PUBLICATIONS

3rd Generation Partnership Project; Technical Specification Group Radio Access Network; Radio Resource Control (RRC); Protocol Specification (Release 7); 3GPP TS 25.331 V7.3.0; Dec. 2006; pp. 353, 677-753 and 1098.
3rd Generation Partnership Project; Technical Specification Group GSM/EDGE Radio Access Network; Location Services (LCS); Mobile Station (MS)—Serving Mobile Location Centre (SMLC) Radio Resource LCS Protocol (RRLP) (Release 7); 3GPP TS 44.031 V7.4.0; Mar. 2007; pp. 34 and 64.
U.S. Appl. No. 11/605,934.

* cited by examiner

*Primary Examiner* — Nguyen Vo
*Assistant Examiner* — Golam Sorowar
(74) *Attorney, Agent, or Firm* — Alfred A. Fressola; Ware, Fressola, Van Der Sluys & Adolphson LLP (57) ABSTRACT

For supporting the provision of a continuous stream of assistance data for a satellite signal based positioning, a sequence of interlinked messages comprising assistance data is generated. The messages are provided for transmission to a wireless communication terminal. The wireless communication terminal receives the sequence of interlinked messages and provides the assistance data in the received messages for use in positioning computations.

31 Claims, 4 Drawing Sheets

ASSISTANCE DATA PROVISION

FIELD OF THE INVENTION

The invention relates to the provision of assistance data for a satellite signal based positioning.

BACKGROUND OF THE INVENTION

An absolute positioning of a device is supported by various Global Navigation Satellite Systems (GNSS). These include for example the American Global Positioning System (GPS), the Russian Global Navigation Satellite System (GLO-NASS), the future European system Galileo, the Space Based Augmentation Systems (SBAS), the Japanese GPS augmentation Quasi-Zenith Satellite System (QZSS), the Locals Area Augmentation Systems (LAAS), and hybrid systems. The satellites of these systems are also referred to as space vehicles (SV).

The constellation in GPS, for example, consists of more than 20 satellites that orbit the earth. Each of the satellites transmits two carrier signals L1 and L2. One of these carrier signals L1 is employed for carrying a navigation message and code signals of a standard positioning service (SPS). The L1 carrier phase is modulated by each satellite with a different C/A (Coarse Acquisition) code. Thus, different channels are obtained for the transmission by the different satellites. The C/A code is a pseudo random noise (PRN) code, which is spreading the spectrum over a 1 MHz bandwidth. It is repeated every 1023 bits, the epoch of the code being 1 ms. The carrier frequency of the L1 signal is further modulated with navigation information at a bit rate of 50 bit/s. The navigation information comprises inter alia ephemeris and almanac parameters. Ephemeris parameters describe short sections of the orbit of the respective satellite. Based on these ephemeris parameters, an algorithm can estimate the position of the satellite for any time while the satellite is in the respective described section. The almanac parameters are similar, but coarser orbit parameters, which are valid for a longer time than the ephemeris parameters. The navigation information further comprises for example clock models that relate the satellite time to the system time of GPS and the system time to the Coordinated Universal Time (UTC).

A GPS receiver of which the position is to be determined receives the signals transmitted by the currently available satellites, and it detects and tracks the channels used by different satellites based on the different comprised C/A codes. Then, the receiver determines the time of transmission of the code transmitted by each satellite, usually based on data in the decoded navigation messages and on counts of epochs and chips of the C/A codes. The time of transmission and the measured time of arrival of a signal at the receiver allow determining the pseudorange between the satellite and the receiver. The term pseudorange denotes the geometric distance between the satellite and the receiver, which distance is biased by unknown satellite and receiver offsets from the GPS system time.

In one possible solution scheme, the offset between the satellite and system clocks is assumed known and the problem reduces to solving a non-linear set of equations of four unknowns (3 receiver position coordinates and the offset between the receiver and GPS system clocks). Therefore, at least 4 measurements are required in order to be able to solve the set of equations. The outcome of the process is the receiver position.

Similarly, it is the general idea of GNSS positioning to receive satellite signals at a receiver which is to be positioned, to measure the pseudorange between the receiver and the respective satellite and further the current position of the receiver, making use in addition of estimated positions of the satellites. Usually, a PRN signal which has been used for modulating a carrier signal is evaluated for positioning, as described above for GPS.

In a further approach, the carrier phases and/or the code phases measured at two GNSS receivers are evaluated for determining the distance and attitude between the two receivers very accurately, typically at cm- or even mm-level accuracy. The combination of the distance and attitude between two receivers, and thus the vector between these receivers, is also referred to as baseline. The carrier phase measurements that are performed at GNSS receivers may be exchanged in real-time or be stored for a later exchange known as post-processing. Usually, one of the GNSS receivers is arranged at a known location and called reference receiver, while the other receiver is to be positioned with respect to the reference receiver and called user receiver or rover. The determined relative position can further be converted into an absolute position, if the location of the reference position is accurately known. However, the relative positioning calculations actually require that the positions of both receivers are known at least approximately. These positions can be obtained from determined pseudoranges. Alternatively, it would also be sufficient to know only a reference location approximately, since the rover location can be obtained therefrom by adding the baseline estimate to the reference location.

A satellite signal is distorted on its way from a satellite to a receiver due to, for instance, multipath propagation and due to influences by ionosphere and troposphere. Moreover, the satellite signal has a bias due to the satellite clock bias. All errors that are common to a signal in both receivers can be assumed to correlate between the receivers and satellites, and thus to vanish in double differencing.

The relative positioning may thus be based more specifically on signal measurements at two GNSS receivers, which are used to form double difference observables. Such signal measurements may include for example carrier phase measurements and PRN code measurements, etc. A double difference observable relating to the carrier phase is the difference in the carrier phase of a specific satellite signal at both receivers compared to the difference in the carrier phase of another satellite signal at both receivers. A double difference observable relating to the PRN code may be obtained correspondingly. The double difference observables can then be employed for determining the position of the receivers relative to each other at high accuracy.

With conventional GNSS positioning, two GNSS receivers are able to determine their location, and therefore the baseline between them, with an accuracy of 5 to 20 meters. The carrier or code phase based approach, in contrast, allows determining the baseline with a much higher accuracy of 0.1 to 10 cm. It is noteworthy that this accuracy can be achieved with standard commercial GNSS-receivers.

When using the carrier or code phase based approach, however, it has to be considered that a carrier or code phase measured at two receivers is based on different number of whole cycles of the carrier. This effect is referred to as double-difference integer ambiguity, which has to be solved. This process is also called integer ambiguity resolution or initialization.

The double-difference integer ambiguity may be resolved by gathering carrier and/or code phase data from a sufficient number of satellites at sufficient measurement instants.

Once the baseline has been determined and the integer ambiguity been resolved, the integer ambiguity solution may be validated in order to determine whether it can be relied on. Integer ambiguity validation is typically done using statistical tools.

The solved and validated integer ambiguities may then be used for tracking the baseline between the receivers at high precision, for instance with a sub-cm accuracy.

The carrier phase measurement performed by a GNSS receiver on a GNSS signal originating from a GNSS SV is also called 'accumulated delta range (ADR) measurement' or 'integrated Doppler measurement'.

Originally, carrier phase based positioning was only available for geodesic surveying and other applications requiring a high accuracy. The equipment required for such applications is expensive and meant, therefore, only for professional use. In these cases, the baseline is moreover often determined off-line. However, it is also possible to obtain a high-precision baseline using two low-cost GNSS-enabled handsets, for example terminals with integrated GNSS-receiver or terminals equipped with an external Bluetooth GNSS-receiver. The data between the terminals can be exchanged using any kind of data transfer technology, like general packet radio service (GPRS), wireless local area networks (WLAN) or Bluetooth™. This allows the baseline to be determined and updated in real-time. This approach is also called mobile Real-Time Kinematics (mRTK), indicating that mobile technology is used to expand the carrier-phase based use cases and bring the benefits of the technology to a wider audience. Instead of a second handset, the reference receiver could also be for instance a location measurement unit (LMU) of a network or a virtual reference station (VRS) for which the required measurement data is provided.

SUMMARY

The invention proceeds from the consideration that when using a wireless access network for supporting a carrier phase based positioning, the positioning could be implemented either in a mobile station assisted approach or in a mobile station based approach. In a mobile station assisted approach, a wireless communication terminal would only perform or collect carrier phase measurements and send them to the network, for example to a serving mobile location centre (SMLC). The network may then perform the required calculations. In a mobile station based approach, in contrast, the network would send carrier phase measurements to a wireless communication terminal so that the wireless communication terminal may calculate the baseline between the reference station and the wireless communication terminal or an associated GNSS receiver.

The invention deals with the need of providing in a mobile station based approach a sufficient amount of carrier phase measurements to a wireless communication terminal, which enable the double-difference integer ambiguity resolution and baseline tracking. The invention further deals with similar needs which exist for other types of assistance data that may be required at a wireless communication terminal for a satellite signal based positioning.

A first method is described, which comprises generating a sequence of interlinked messages comprising assistance data for a satellite signal based positioning. The method further comprises providing the messages for transmission to a wireless communication terminal.

Moreover, a first apparatus is described, which comprises at least one processing component configured to generate a sequence of interlinked messages comprising assistance data for a satellite signal based positioning and configured to provide the messages for transmission to a wireless communication terminal.

The at least one processing component can be implemented in hardware and/or software. It may be for instance a processor executing software program code for realizing the required functions. Alternatively, it could be for instance a circuit that is designed to realize the required functions, for instance implemented in a chipset or a chip, like an integrated circuit. The described apparatus can be for example identical to a comprised processing component, but it may also comprise additional components. The apparatus could further be for example a module provided for integration into a device, like a base station of a cellular network or WLAN or a server in such a network.

Moreover, a first device is described, which comprises the described first apparatus and in addition an interface enabling a direct or indirect communication with another device. Such another device could be for instance a wireless communication terminal, like a mobile phone or a laptop.

Moreover, a first computer program product is described, in which program code is stored in a computer readable medium. The program code realizes the described first method when executed by a processor, for instance a processor of some network element. The computer program product could be for example a separate memory device, or a memory that is to be integrated in a device. The invention is to be understood to cover such program code also independently from a computer program product and a computer readable medium.

Moreover, a second method is described, which comprises receiving a sequence of interlinked messages comprising assistance data for a satellite signal based positioning. The method further comprises providing the assistance data in the received messages for use in positioning computations.

Moreover, a second apparatus is described, which comprises at least one processing component configured to receive a sequence of interlinked messages comprising assistance data for a satellite signal based positioning and configured to provide the assistance data in the received messages for use in positioning computations.

The at least one processing component of the second apparatus can equally be implemented in hardware and/or software. It may be for instance a processor executing software program code for realizing the required functions. Alternatively, it could be for instance a circuit that is designed to realize the required functions, for instance implemented in a chipset or a chip, like an integrated circuit. The described apparatus can be for example identical to a comprised processing component, but it may also comprise additional components. The apparatus could further be for example a module provided for integration into a device, like a wireless communication terminal.

Moreover, a second device is described, which comprises the described second apparatus and in addition an interface enabling a direct or indirect communication with another device. The second device itself could be for instance a wireless communication terminal, while the other device could be for instance a base station of a cellular communication network or of a WLAN, or some network server. Other exemplary components that could be included in the second device are a GNSS receiver or a user interface.

The second device could also belong to an arrangement, which comprises in addition a further device including a GNSS receiver. The second device could be for example a mobile terminal and the further device an accessory device for the mobile terminal.

Moreover, a second computer program product is described, in which program code is stored in a computer readable medium. The program code realizes the described second method when executed by a processor. The computer program product could be again for example a separate memory device, or a memory that is to be integrated in an electronic device. The invention is to be understood to cover such a computer program code also independently from a computer program product and a computer readable medium.

Finally, a system is described, which comprises the described first apparatus and the described second apparatus.

The proposed use of interlinked messages for transmitting assistance data allows ensuring that the messages are transmitted in regular intervals, as required for carrier phase based positioning, but equally for other types of assistance data.

In the sequence of messages each message—or each set of messages, if the assistance data does not fit into one message—could contain the same kind of information, only for a different time instant.

The generation of interlinked messages can be realized in different ways.

In one exemplary embodiment, the messages are interlinked in that the messages are generated periodically at a transmitting end, and thus also received periodically at a receiving end. The periodic transmission of the messages may be initiated by the receiving end or the transmitting end.

In another exemplary embodiment, the messages are interlinked in that generating a message at a transmitting end is triggered by a receipt of a respective request from the wireless communication terminal, which in turn transmits a new request upon receipt of a generated message. On the receiving side, the messages are interlinked correspondingly in that the messages are received upon a respective request, and that a respective request is generated upon receipt of a respective message of the sequence of messages. The first request or the first message may be generated independently either on the transmitting side or on the receiving side of the sequence of messages.

In this embodiment, the messages including the assistance data are thus provided continuously in a pseudo-periodic manner. Pseudo-periodic assistance can be used for example in circumstances, in which a network (or some part of it) is not able to provide a wireless communication terminal with assistance at determined or predetermined intervals.

In one embodiment, it may further be checked, whether the provided and received messages contain indeed continuous assistance data. The transmitting end may check whether the provided assistance data has a desired continuity with the assistance data in a preceding message and include at least one corresponding continuity indicator in each message. If each received message includes at least one continuity indicator, the receiving end may further accept only assistance data for which a continuity indicator indicates that it has a desired continuity with assistance data in a preceding message to be correct assistance data.

In case the assistance data comprises measurements on different satellite signals, for example, a continuity indicator could be provided per signal measurement. It has to be noted that the continuity check could also take into account the continuity of measurement that are performed between the measurements which are included in the assistance data. For other types of assistance data, a continuity indicator may be also beneficial.

Providing the assistance data in the received messages for use in positioning computations may comprise storing the provided assistance data for later use in positioning computations. In case a discontinuity is detected, the currently stored data may be deleted and a collection of new assistance data be started.

Alternatively, the provided assistance data may be used immediately as a basis for performing positioning computations. In case a discontinuity is detected, the ongoing computations may be stopped, and new computations be started for new assistance data. Alternatively, it may be possible in some cases to compensate for the discontinuities.

As indicated above, the assistance data provided in the sequences of messages may be of various kinds.

In one embodiment, the assistance data may comprise carrier-phase measurements on satellite signals for a reference station, the carrier-phase measurements enabling a relative positioning of a satellite signal receiver to the reference station. A receiving end receiving such messages may then use the provided assistance data in determining a relative position of a satellite signal receiver to the reference station. This embodiment enables a wireless communication terminal to perform high-accuracy positioning calculations using assistance from a network. Assistance from a network can be provided in general for a reference station of which the location is accurately known, so that the wireless communication terminal may also be enabled to perform positioning calculations resulting in an absolute position of high accuracy.

In this case, the invention can be employed for example in high-precision navigation and surveying applications. It can be provided for professional use, but also for fun applications, such as writing with a GNSS receiver.

In another embodiment, the assistance data may comprise for example extended navigation models. Conventionally, only one set of navigation data for a given satellite can be provided as navigation model assistance to a terminal. This means that when the navigation model is updated, the terminal must be provided with a new set of data.

However, there are services that provide extended navigation data that is valid for 5 to 10 days, or even longer. The described sequence of interlinked messages may now be utilized for providing a periodic update of extended navigation model to the terminal. Hence, the terminal always has navigation data available for maximum period of time. This allows for a short Time-To-First-Fix even if the terminal was not connected to the network for a prolonged period or was not able to receive navigation models for some reason.

The invention can be employed in particular, though not exclusively, for downlink transmissions of GNSS related assistance data by any type of network, like a global system for mobile communications (GSM) network, a universal mobile telecommunications system (UMTS) network, or a code division multiple access (CDMA) network or any location protocol like an Open mobile alliance Secure user plane location (OMA SUPL) protocol. Any term used in this document that might be specific to a particular communication standard is to be understood to cover as well corresponding terms, in particular corresponding terms in other communication standards. For example, any reference to a mobile station is to be understood to relate as well to user equipment, and any reference to a base station is to be understood to relate as well to a radio network controller (RNC) or Serving Mobile Location Center (SMLC) server.

The invention can further be used with any kind of satellite signals, in particular, though not exclusively, with satellite signals transmitted in a GNSS, like GPS, GLONASS, GALILEO, SBAS, QZSS, LAAS or a combination of these. LAAS makes use of pseudolites instead of true satellites, but these pseudolites are to be understood to be covered as well by the term satellite as used in this application. LAAS has the advantage that it enables the use of a carrier- or code-phase based positioning under indoor conditions as well.

It is to be understood that all presented exemplary embodiments may also be used in any suitable combination.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION OF THE INVENTION

Figure 1:
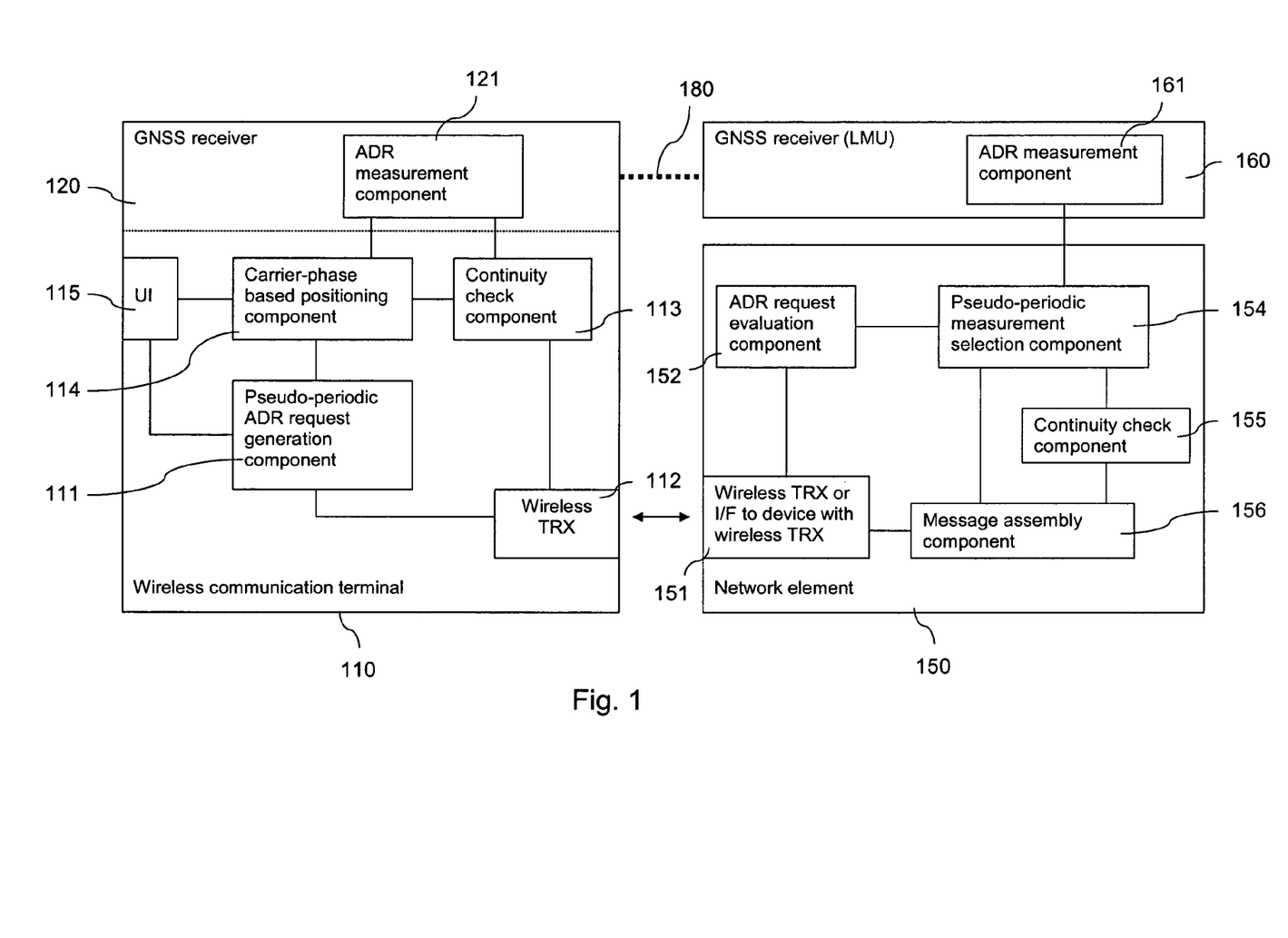
FIG. 1 is a schematic block diagram of a system according to a first embodiment of the invention.

FIG. 1 is a schematic block diagram of a system, which enables a pseudo-periodic transmission of carrier-phase measurements to a wireless communication terminal in accordance with a first embodiment of the invention.

The system comprises a wireless communication terminal 110 and a network element 150.

The wireless communication terminal 110 can be for instance a mobile phone.

The wireless communication terminal 110 comprises a GNSS receiver 120 including an ADR measurement component 121, which is able to perform carrier phase measurements on received satellite signals of at least one GNSS, for instance Galileo. As indicated by a dashed line, the GNSS receiver 120 could also be a separate accessory device that can be linked to the wireless communication terminal 110 using any suitable link, like a physical connection or a Bluetooth™ link, etc.

The wireless communication terminal 110 further comprises a pseudo-periodic ADR request generation component 111. The ADR request generation component 111 is linked to a wireless transceiver 112 of the terminal 110. The transceiver 112 enables a communication via a wireless link with a wireless access network. The transceiver 112 could belong for instance to a cellular engine of the terminal 110 and support an access to a cellular communication network, or it could belong to a WLAN engine of the terminal 110 and support an access to a WLAN, etc. The wireless transceiver 112 is moreover linked within the terminal 110 via a continuity check component 113 to a carrier-phase based positioning component 114. The ADR measurement component 121 is linked to both the continuity check component 113 and the carrier-phase based positioning component 114. The carrier-phase based positioning component 114 is linked in addition within the terminal 110 to the ADR request generation component 111. Finally, a user interface (UI) 115 of the terminal 110 is linked to the ADR request generation component 111 and to the carrier-phase based positioning component 114.

The components of terminal 110 may be implemented in hardware, for example in an integrated circuit chip. It is to be understood, though, the functions of some or all of the depicted components could also be implemented in program code modules that are executed by a processor.

Further, it is to be understood that the functions realized by the components 111, 113 and 114 could also be implemented in the GNSS receiver 120 instead or be distributed to components of the terminal 110 in many different ways.

The network element 150 can be for instance a fixed station, like a base station of a cellular communication network or a WLAN, or a network server linked to such a base station, like an SMLC.

The network element 150 comprises an interface 151. The interface 151 enables a direct or indirect communication with wireless communication terminal 110. If the network element 150 is a base station of a wireless communication network, for example, the interface 151 could be a transceiver, which enables the wireless communication terminal 110 to access the wireless communication network. If the network element 150 is a network server, the interface may be an interface to other network elements, which connect the network element 150 to a base station of a wireless communication network that may be accessed by the wireless communication terminal 110.

The interface 151 is linked within network element 150 to an ADR request evaluation component 152. Within the network element 150, moreover a pseudo-periodic measurement selection component 154 is linked on the one hand directly and on the other hand via a continuity check component 155 to a message assembly component 156, the latter being further linked to the interface 151. Component 152 is moreover linked to the measurement selection component 154.

The measurement selection component 154 is linked in addition to an ADR measurement component 161 of a GNSS receiver 160. The ADR measurement component 161 is able to perform carrier phase measurements on received satellite signals of at least one GNSS, for instance GPS and Galileo. This GNSS receiver 160 could be integrated in the network element 150, but in the present embodiment, it is assumed to be a separate location measurement unit (LMU) that is connected to the network element 150 using any suitable link, for example a wired link.

The components of the network element 150 may be implemented in hardware, for example in an integrated circuit chip. It is to be understood, however, that some or all of the functions of components 152 to 156 could also be implemented in program code modules executed by a processor of the network element 150.

It is further to be understood that some of the depicted components of the network element 150 could also belong to the GNSS receiver 160 instead or that the associated functions could be distributed to components of the network element 150 in many different ways.

The distance and attitude between GNSS receiver 120 and GNSS receiver 160, and more specifically between their respective GNSS antenna reference points, is represented in FIG. 1 by a bold, dotted baseline 180.

The GNSS receivers 120, 160 are both configured to operate as normal GNSS receivers. That is, they are configured to receive, acquire, track and decode signals transmitted by satellites belonging to one or more GNSSs, like GPS and Galileo. Further, the GNSS receivers 120, 160 are configured to compute a stand-alone position in a known manner based on the received satellite signals. It is to be understood that the required computations could also be realized in a processing component outside of the GNSS receivers 120, 160.

For a particular application, however, the position of GNSS receiver 120, or more precisely the position of the reference point of its antenna, might have to be determined with high-precision. To this end, an enhanced carrier-phase based positioning is employed, as illustrated in the flow chart of FIG. 2.

Figure 2:
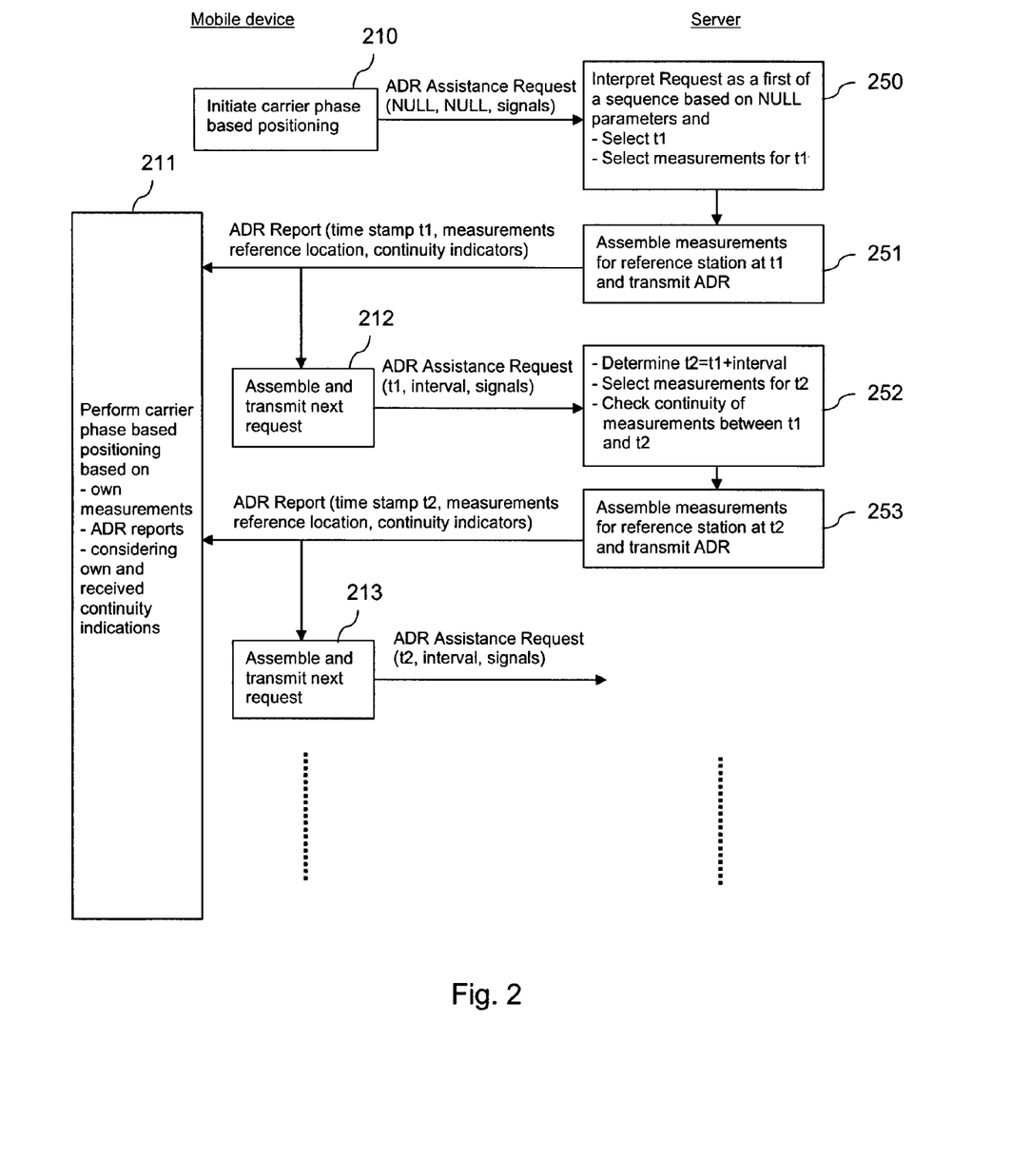
FIG. 2 is a flow chart illustrating an exemplary operation in the system of FIG. 1.

The ADR request generation component 111 of the wireless communication terminal 110 initiates the high-precision positioning (for instance upon a corresponding user input via the user interface 115) by sending a first ADR assistance request (ADRAR) via the transceiver 112 to the network (step 210).

In the presented, exemplary embodiment, each ADRAR has three parameters (t, interval, signals): the time t of previous measurements received from the network, a desired interval between these previous measurements and the next measurements and an indication of the type of the signals for which ADR measurements are requested. An example of such signals would be Galileo E5a.

In the first ADRAR message, the first two parameters are omitted or set to 'NULL': (NULL, NULL, signals).

In the network, the ADRAR is provided to the network element 150. Here, the request is received via interface 151 and provided to the ADR request evaluation component 152.

Due to the two NULL parameters, the ADR request evaluation component 152 interprets the request to be the first request of a sequence of ADRARs (step 250). It thus determines a suitable measurement time t1 and provides an indication of this time t1 together with the indicated signal type to the measurement selection component 154.

The measurement selection component 154 continuously receives from the ADR measurement component 161 ADR measurements on all signals received by the GNSS receiver 160 and in addition a continuity indication for each measurement. The GNSS receiver 160 determines these continuity indications based on the signal statistics.

The measurement selection component 154 now selects measurements performed at time instant t1 for all available signals of the indicated type and provides the selected measurements and a time stamp t1 indicating the time of measurement to the to the message assembly component 156. Moreover, it provides the continuity indication for the selected measurements as provided by the ADR measurement component 161 to the continuity check component 155. Since the request is the first request for the present session, only a single continuity indication is provided for each signal and the continuity check component 155 sets a continuity indicator for each signal by default to '1' indicating continuity, while a '0' would indicate discontinuity. The continuity check component 155 then provides the continuity indicators to the message assembly component 156 as well.

Based on the received information, the message assembly component 156 assembles an ADR report (step 251) for time t1. The ADR report includes at least a time stamp for t1, the carrier-phase measurements, an indication of the exact, known location of the GNSS antenna of the GNSS receiver 160 and the continuity indicators. In addition, the report could contain for example code phase measurements provided by the ADR measurement component 161 and polarity information for the ADR measurements, if not specified in some other manner. It may also be specified, for instance, that the carrier phase polarity is always positive, that is, data bits are received non-inverted. If this is not the case, the measuring engine, that is, the ADR measurement component 161, must invert the polarity individually if needed.

The assembled ADR report is transmitted via the interface 151 to terminal 110, where it is received via transceiver 112.

The continuity check component 113 monitors the continuity indicators in the received message, which indicate continuity for all measurements in the first ADR report. The continuity check component 113 therefore causes the carrier-phase based positioning component 114 to start relative positioning computations using double difference observations, which are formed from the carrier phase measurements of GNSS signals received in the ADR report and from carrier phase measurements provided by ADR measurement component 121 for the same instant of time t1 (step 211).

As mentioned above, carrier-phase based positioning computations are based specifically on solving double-difference integer ambiguities. The problem formulation may lead to an exemplary measurement equation given by:

$$\phi_{km}^{pq} = \rho_{km}^{pq} + \lambda N_{km}^{pq} + T_{km}^{pq} - \left(\frac{\lambda}{\lambda_{ref}}\right)^2 I_{km}^{pq} + \varepsilon_{km}^{pq}, \quad (1)$$

where $\phi_{km}^{pq}$ is the double difference observable defined by $\phi_{km}^{pq}=(\phi_k^p-\phi_m^p)-(\phi_k^q-\phi_m^q)$, where $\phi_k^p, \phi_m^p, \phi_k^q, \phi_m^q$ are the carrier phase measurements by the receivers k (GNSS receiver 160) and m (GNSS receiver 120) of the signals originating from the satellites p and q. Moreover, $\rho_{km}^{pq}$ is the difference of geometric ranges defined by $$\rho_{km}^{pq} = (\rho_k^p - \rho_m^p) - (\rho_k^q - \rho_m^q)$$
$$= (\|\underline{x}^p - \underline{x}_k\| - \|\underline{x}^p - (\underline{x}_k + \underline{b})\|) -$$
$$(\|\underline{x}^q - \underline{x}_k\| - \|\underline{x}^q - (\underline{x}_k + \underline{b})\|),$$

where $x^p$ and $x^q$ are the positions of the satellites p and q, respectively. $x_k$ is the position of the reference receiver 160 and b is the unknown baseline 180 to be determined. Finally, $\lambda$, $\lambda_{ref}$, $N_{km}^{pq}$, $T_{km}^{pq}$, $I_{km}^{pq}$ and $\varepsilon_{km}^{pq}$ are the wavelength, reference wavelength (typically $\lambda_{L1}$) unknown double difference ambiguity (note that $N_{km}^{pq} \in \aleph^{n \times 1}$), troposphere delay, ionosphere advance and double-difference measurement noise, respectively.

It has to be noted that a time variable has been omitted from the equations for the sake of clarity. Also note that $T_{km}^{pq}$ and $I_{km}^{pq}$ may be neglected in short baseline applications. Another possibility is to compensate these error sources using external models or in case multi-band observations are available, these terms can be solved. In general, it has to be noted that the presented equations may be modified and extended in various ways.

Solving equation (1), which can be realized with any suitable approach, yields the fixed baseline estimate $\hat{b}$ and double-difference integer ambiguities $\hat{N}$. Once the double-difference integer ambiguities are solved, the baseline estimate can be tracked easily.

The carrier phase based positioning requires, however, that the carrier-phase based positioning component 114 functioning as calculating engine receives measurements from the GNSS receivers 120, 160 at certain intervals for some time. The required period of time may or may not be predetermined. If it is not predetermined, the carrier phase based positioning component 114 may indicate to the ADR request generation component 111 after receipt of a new ADR report, whether further regular measurements are required.

The ADR request generation component 111 is informed about the received ADR report and the indicated time stamp t1, for example by the carrier phase based positioning component 114. Thereupon, the ADR request generation component 111 generates a new ADRAR. The new ADRAR contains as parameters the time of the first measurements t1, a desired measurement interval and again the desired type of signals. The new ADRAR is transmitted as well to the network element 150. (step 212) The ADR request evaluation component 152 detects that the newly received ADRAR is not the first ADRAR based on the included parameters. Based on the parameters, it determines the next required measurement instance 't2=t1+interval' and provides an indication of time instant t2 and the indicated signal type to the measurement selection component 154.

The measurement selection component 154 now selects measurements performed at time instant t2 for signals of the indicated type and provides the selected measurements and a time stamp t2 indicating the time of measurement to the message assembly component 156. In addition, it provides all continuity indications provided by the ADR measurement component 161 for the time interval from t1 to t2 for the signals of the indicated type to the continuity check component 155.

Correct processing of equation (1) can only be guaranteed if the input carrier phase measurements are continuous. Therefore, the continuity check component 155 checks whether the measurements for the signals of the desired type have been continuous during the entire interval t1 through t2 based on the received continuity indications and generates a corresponding continuity indicator for each signal and thus for each selected measurement. The continuity check component 155 then provides the determined continuity indicators to the message assembly component 156.

The message assembly component 156 assembles an ADR report (step 253) for time t2, including at least a time stamp for t2, carrier-phase measurements, an indication of the exact location of the GNSS antenna of the GNSS receiver 160 and the continuity indicators.

At terminal 110 receiving the ADR report, the continuity check component 113 checks the continuity indicators in the received ADR report. In addition, it checks the continuity of the measurements provided by the ADR measurement component 121 in the interval from t1 to t2.

If continuity is determined to be given for the measurements from both ADR measurement components 121, 161, the continuity check component 113 causes the carrier-phase based positioning component 114 to continue with the ongoing relative positioning computations using double difference observations, which are formed from the new carrier phase measurements of GNSS signals received in the ADR report and from new carrier phase measurements provided by ADR measurement component 121 for the same instant of time t2 (step 211). Otherwise, new relative positioning computations are initiated. In a situation in which nine out of ten measurements have been continuous during the last measurement interval, for example, the discontinuous measurement could be discarded and new calculations could be performed using nine measurements instead of ten previously used.

This sequence continues until terminal 110 terminates sending ADRARs. That is, the terminal 110 sends ADRAR and the network element 150 returns corresponding ADR reports. Every ADRAR after the first contains a time stamp of the last measurement instant.

Once the double difference integer ambiguities have been resolved and the baseline been determined, the baseline may be tracked and the absolute position of the GNSS receiver 120 be determined for each baseline based on the known precise absolute position of the GNSS receiver 160. The absolute position may then be used for a corresponding presentation to a user via the user interface 115.

The presented approach is called pseudo-periodic, since the wireless communication terminal 110 must trigger the measurements. Although in current standards it is possible to request certain information time after time, the current pseudo-periodic request differs from these. In the presented pseudo-periodic approach, the requests and the returned measurement messages have a certain connection to each other in time. This allows the network element 150 to monitor the continuity of the measurement reports that are transmitted in reply to an ADRAR and producing continuity information that is included in the measurement reports.

It has to be noted that the sequence could also be initiated by the network element 150. In the case of a network initiation, there could be first a location request from the network element 150 to the wireless communication terminal 110, and thereafter the sequence would continue as described above.

While in the described embodiment each measurement report includes a time stamp, it may be sufficient in some cases if only a response to the first pseudo-periodic ADRAR contains a time stamp. For example, a time stamp could always be included if the time of the previous measurement is NULL. In the subsequent reports, the time stamp may be omitted, if the measurement has been taken exactly at the requested interval. Since the terminal 110 knows the time of the last measurement and the interval it requested, the measurement time for the current measurement can be reconstructed at the terminal 110.

Also, it could be implemented that the terminal 110 does not need to specify the signals in the ADRAR, if the requested signal measurements are exactly as in the previous message.

Further, in the presented embodiment the network element 150 does not need to remember the time of the last measurement, since it is specified in each ADRAR. In this case, the network element 150 only has to keep track of ADR discontinuities so that it can report those to the terminal 110. However, in case the network element 150 is capable of remembering the session, only the first ADRAR might contain the signal information and the requested measurement interval. The subsequent ADRARs need not specify anything, since the network element 150 remembers the desired interval, the time of the last message and the requested signal types. The ADR report could then contain just the measurements, and in addition a time stamp in case the interval deviates from the requested.

Figure 3:
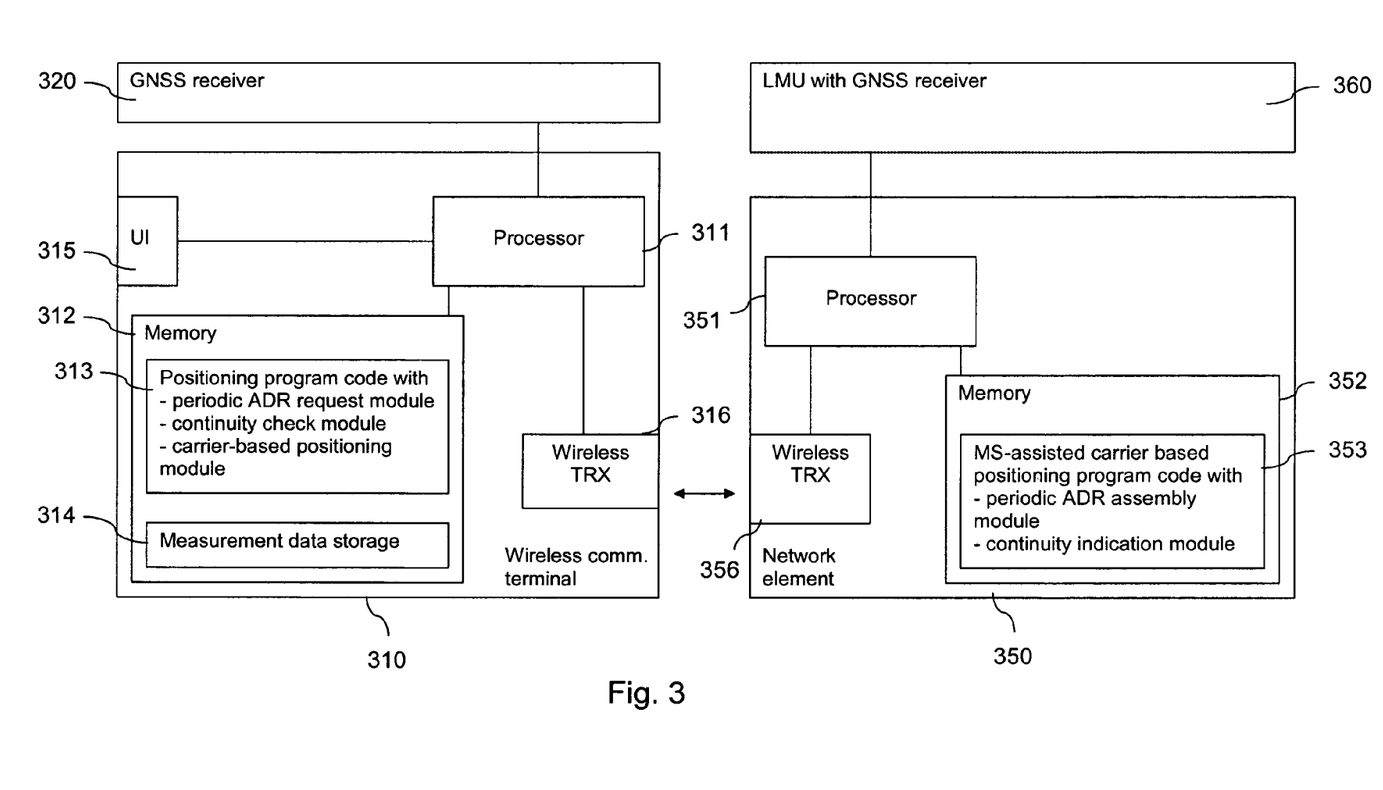
FIG. 3 is a schematic block diagram of a system according to a second embodiment of the invention.

FIG. 3 is a schematic block diagram of a system, which enables a periodic transmission of carrier-phase measurements to a wireless communication terminal in accordance with a second embodiment of the invention.

The system comprises again a wireless communication terminal 310 and a network element 350.

The terminal 310 can be again for instance a laptop.

The wireless communication terminal 310 comprises a processor 311 and, linked to this processor 311, a memory 312, a user interface 315 and a transceiver (TRX) 316.

The processor 311 is further linked to a separate GNSS receiver 320, for instance using a Bluetooth™ link. Thus, the GNSS receiver 320 could be moved by a user separately from the terminal 310.

The processor 311 is configured to execute implemented computer program code. The memory 312 stores computer program code, which may be retrieved by the processor 311 for execution. The stored computer program codes comprise a positioning program code 313, which includes functional modules for generating periodic ADR assistant requests, for performing a continuity check and for performing the actual carrier phase based positioning.

It is to be understood that the functions of the processor 311 could also be implemented in hardware in the terminal 310, for example in the form of an integrated circuit chip.

Further, it is to be understood that functions realized by the processor 311 could also be realized for example by the GNSS receiver 320.

The network element 350 can be for instance a base station of a cellular communication network.

The network element 350 comprises a processor 351 and, linked to this processor 351, a memory 352 and a transceiver 356. The processor is further linked to an external LMU 360 with GNSS receiver.

The processor 351 is configured to execute implemented computer program code. The memory 352 stores computer program code, which may be retrieved by the processor 351 for execution. The stored computer program codes comprise an MS assisted carrier based positioning program code 353 including functional modules for periodic ADR assembly and for generating continuity indications.

It is to be understood that the functions of processor 351 could also be implemented in hardware in network element 350, for example in the form of an integrated circuit chip.

The transceiver 316 of the wireless communication terminal 310 and the transceiver 356 of the network element 350 are configured to enable a wireless communication between the devices 310, 350 using a cellular link or a non-cellular link, like a wireless LAN connection, a Bluetooth™ connection, a UWB connection or an infrared connection. The employed communication channel may also be a control plane channel or a secure user plane location (SUPL) channel.

The GNSS receivers 320, 360 are both configured to operate as normal GNSS receivers. That is, they are configured to receive, acquire, track and decode signals transmitted by satellites belonging to one or more GNSSs, like GPS and Galileo. Further, they are configured to compute a stand-alone position in a known manner based on the received satellite signals. It is to be understood that the required computations could also be realized in a processing component outside of the GNSS receivers 320, 360, for example in processor 311 or 351, respectively.

For a particular application, however, the relative position of the GNSS receiver 320 compared to a reference station might have to be determined with a high-precision. To this end, an enhanced carrier phase based positioning is employed, as illustrated in the flow chart of FIG. 4.

Figure 4:
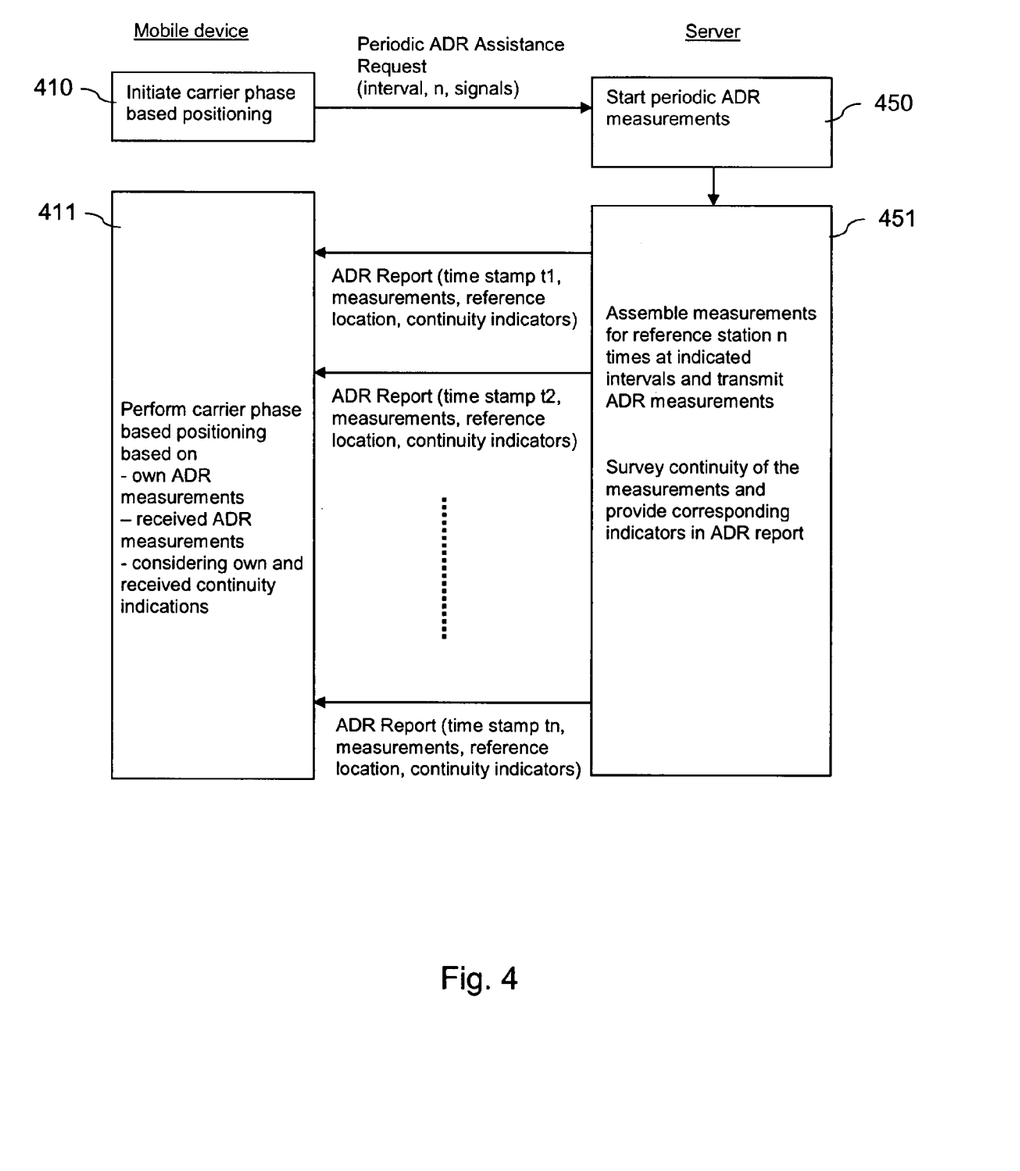
FIG. 4 is a flow chart illustrating an exemplary operation in the system of FIG. 3.

Using computer program code 313, the processor 311 of the terminal 310 generates a periodic ADR assistance request PADRAR to initiate an MS based positioning. The PADRAR is transmitted to network element 350 via transceiver 316 (step 410). The request identifies intervals between measurement instants at which carrier-phase measurements are to be provided, the number n of desired measurement reports and the type of signals for which measurements are desired (interval, n, signals). The number n may also be infinite. The desired signals may be for instance GPS L1 or Galileo E5a, but also any other type of satellite signal.

Further, the processor 311 causes the GNSS receiver 320 to continuously provide carrier phase measurements including an indication of the measurement instants as well as the continuity indications for each of the measured signals.

In the meantime, the processor 351 of the network element 350 receives the PADRAR via interface 356. It uses thereupon computer program code 353 for causing the LMU 360 to continuously perform carrier phase measurements for the selected type of signals and to provide the measurements together with an indication of the respective measurement time and a respective continuity indication (step 450).

The processor 351 selects the measurements of time instants t1-tn and surveys continuity of the selected measurements based on the continuity indications provided for the respectively preceding interval for ensuring that the signal measurements have been continuous between the selected measurement instants. Further, the processor 351 periodically assembles an ADR report including a time stamp t1 to tn, the measurements, a reference location and continuity indicators, and provides this report for transmission to the wireless communication terminal 310 via interface 356. (step 451)

It has to be noted that while the measurements included by processor 351 in the ADR reports could be the measurements provided by the LMU 360 for the location of the LMU 360, the processor 351 could also convert the received measurements based on additionally provided navigation data to measurements for a virtual reference station (VRS) located at any desired location. If the wireless communication terminal 310 provides in the PADRAR in addition a rough position estimate calculated using standard GNSS positioning calculations, using such a virtual reference station at a similar location is suited to minimize the length of the baseline that is to be determined and tracked. This improves the performance and reliability of carrier phase based positioning.

The processor 311 receives the periodic ADR reports via transceiver 316. It selects ADR measurements from GNSS receiver 320 for the same measurement instants t1-tn and monitors their continuity. As long as the continuity indicators included in the ADR reports indicate continuous measurements and also the ADR measurements from GNSS receiver 320 are determined to be continuous, the processor 311 uses the received ADR measurements together with ADR measurements from GNSS receiver 320 for the same measurement instants for determining and tracking the current baseline between the GNSS receiver 320 and the employed reference station, e.g. LMU 360 (step 411). To this end, above equation (1) may be used again. Based on the known location of the reference station, the accurate absolute position of the GNSS receiver 320 may be determined as well, if desired.

The user interface 315 may enable a user to initiate the positioning and/or enable the processor 311 to present the result of the positioning to a user.

Instead of performing the positioning calculations immediately, measurement results from GNSS receiver 320 and LMU 360 for the identical continuous sequence of time instants could also be stored in the data storage portion 314 of the memory 312 for later evaluation.

The session may be terminated by the terminal 310 or the network element 350 at any time.

In the second presented embodiment, it has been assumed again that each ADR report contains a time stamp for the time of measurement. However, a time stamp is not necessary in all the cases. Similarly as in the first embodiment, the first ADR report, which is transmitted in response to the PADRAR, should contain a time stamp. The subsequent ADR reports need not include such a time stamp, if the measurement interval is exactly as specified in the PADRAR. Further, in case each ADR report shall contain a time stamp, the time stamps can be real-time time stamps or delta time stamps indicating the time difference of the current measurement to the first measurement of the session.

Both presented embodiments enable a high-accuracy relative positioning of a GNSS receiver in a wireless communication terminal using the assistance from a wireless communication network. Since the network knows the exact location of a selected reference station, the wireless communication terminal can also be positioned absolutely at high accuracy.

It has to be noted that the presented handling of time stamps or message sequences is exemplary only and may be varied in any suitable manner. Further, the invention is not limited to carrier phase based positioning. Pseudo-periodic and periodic messages may also be utilized for any other assistance data.

The functions illustrated by components 152-156 or by the processor 351 executing program code 353 can also be viewed as means for generating a sequence of interlinked messages comprising assistance data for a satellite signal based positioning and as means for providing the messages for transmission to a wireless communication terminal. Alternatively, the functions illustrated by the functional modules of the program code 353 can be viewed as such means.

Further, the functions illustrated by components 111-114 or by the processor 311 executing program code 313 can also be viewed as means for receiving a sequence of interlinked messages comprising assistance data for a satellite signal based positioning and as means for providing the assistance data in the received messages for use in positioning computations. Alternatively, the functions illustrated by the functional modules of the program code 313 can be viewed as such means.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto. Furthermore, in the claims means-plus-function clauses are intended to cover the structures described herein as performing the recited function and not only structural equivalents, but also equivalent structures.

What is claimed is:

1. A method comprising:
    generating a sequence of interlinked messages comprising assistance data for a satellite signal based positioning;
    checking whether the assistance data that is to be included in a message of said sequence of interlinked messages has a desired continuity with the assistance data in a preceding message of said sequence of interlinked messages and including at least one corresponding continuity indicator in each message; and
    providing the sequence of interlinked messages for transmission to a wireless communication terminal after said checking and including.

2. The method according to claim 1, wherein the messages are interlinked in that they are generated periodically.

3. The method according to claim 1, wherein the messages are interlinked in that generating a message is triggered by a receipt of a respective request from the wireless communication terminal, which in turn transmits a new request upon receipt of a generated message.

4. The method according to claim 1, wherein the assistance data includes carrier-phase measurements on satellite signals for a reference station, the carrier-phase measurements enabling a relative positioning of a satellite signal receiver to the reference station.

5. An apparatus comprising at least one processing component and at least one memory including computer program code, the at least one memory and the computer program code configured to, with the at least one processing component, cause the apparatus at least to perform:
    generating a sequence of interlinked messages comprising assistance data for a satellite signal based positioning;
    checking whether the assistance data that is to be included in a message of said sequence of interlinked messages has a desired continuity with the assistance data in a preceding message of said sequence of interlinked messages and including at least one corresponding continuity indicator in each said message; and
    providing the sequence of interlinked messages for transmission to a wireless communication terminal after said checking and including.

6. The apparatus according to claim 5, wherein the at least one processing component and the at least one memory and computer program code are configured to cause the apparatus to perform:
    generating a sequence of interlinked messages by generating the messages of the sequence periodically.

7. The apparatus according to claim 5, wherein the at least one processing component and the at least one memory and computer program code are configured to cause the apparatus to perform:
    generating a sequence of interlinked messages in that the at least one processing component and the at least one memory and computer program code are further configured to cause the apparatus to perform detecting a receipt of a request for a message from the wireless communication terminal and to trigger a generation of a new message of the sequence of messages upon receipt of such a request, the wireless communication terminal transmitting a new request upon receipt of a generated message.

8. The apparatus according to claim 5, wherein the at least one processing component and the at least one memory and computer program code are configured to cause the apparatus to perform:
    including carrier-phase measurements on satellite signals for a reference station in the assistance data, the carrier-phase measurements enabling a relative positioning of a satellite signal receiver to the reference station.

9. A device comprising:
    an apparatus according to claim 5; and
    an interface configured to enable a communication with a wireless communication terminal.

10. A computer program product in which program code is stored in a computer readable medium the program code realizing the following when executed in a processor:
    generating a sequence of interlinked messages comprising assistance data for a satellite signal based positioning;
    checking whether the assistance data that is to be included in a message of said sequence of interlinked messages has a desired continuity with the assistance data in a preceding message of said sequence of interlinked messages and including at least one corresponding continuity indicator in said each messages; and
    providing the sequence of interlinked messages for transmission to a wireless communication terminal after said checking and including.

11. The computer program product according to claim 10, wherein the messages are interlinked in that they are generated periodically.

12. The computer program product according to claim 10, wherein the messages are interlinked in that generating a message is triggered by a receipt of a respective request from the wireless communication terminal, which in turn transmits a new request upon receipt of a generated message.

13. An apparatus comprising:
means for generating a sequence of interlinked messages comprising assistance data for a satellite signal based positioning;
means for checking whether the assistance data that is to be included in a message of said sequence of interlinked messages has a desired continuity with the assistance data in a preceding message of said sequence of interlinked messages and including at least one corresponding continuity indicator in each said message; and
means for providing the sequence of interlinked messages for transmission to a wireless communication terminal after said checking and including.

14. A method comprising:
receiving a sequence of interlinked messages comprising assistance data for a satellite signal based positioning;
providing the assistance data in the received messages for use in positioning computations; and
wherein each received message includes at least one continuity indicator, the method further comprising accepting assistance data in said sequence of interlinked messages to be correct assistance data if the received sequence of interlinked messages included checking whether the assistance data to be included in a message of said sequence of interlinked messages has a desired continuity with the assistance data in a preceding message of said sequence of interlinked messages and included at least one corresponding continuity indicator in each said message.

15. The method according to claim 14, wherein the messages are interlinked in that they are received periodically.

16. The method according to claim 14, wherein the messages are interlinked in that they are received upon a respective request, and in that the method further comprises generating a respective request upon receipt of a respective message of the sequence of messages.

17. The method according to claim 14, wherein providing the assistance data in the received messages for use in positioning computations comprises storing the provided assistance data for later use in positioning computations.

18. The method according to claim 14, further comprising performing positioning computations based on the provided assistance data.

19. The method according to claim 14, wherein the assistance data includes carrier-phase measurements on satellite signals for a reference station, the method further comprising using the provided assistance data in determining a relative position of a satellite signal receiver to the reference station.

20. An apparatus comprising at least one processing component and at least one memory including computer program code, the at least one memory and the computer program code configured to, with the at least one processing component, cause the apparatus at least to perform:
receiving a sequence of interlinked messages comprising assistance data for a satellite signal based positioning;
providing the assistance data in the received messages for use in positioning computations; and
wherein each received message includes at least one continuity indicator, wherein the at least one processing component and at least one memory including computer program code are further configured to cause the apparatus at least to perform accepting assistance data in said sequence of interlinked messages to be correct assistance data if the received sequence of interlinked messages included checking whether the assistance data to be included in a message of said sequence of interlinked messages has a desired continuity with the assistance data in a preceding message of said sequence of interlinked messages and included at least one corresponding continuity indicator in each said message.

21. The apparatus according to claim 20, wherein the messages are interlinked in that the messages are received periodically.

22. The apparatus according to claim 20, wherein the messages are interlinked in that the messages are received upon a respective request, and wherein the at least one processing component and the at least one memory and computer program code are further configured to cause the apparatus to perform:
generating a respective request upon receipt of a respective message of the sequence of messages.

23. The apparatus according to claim 20, wherein the at least one processing component and the at least one memory and computer program code are further configured to cause the apparatus to perform:
providing the assistance data in the received messages for use in positioning computations by storing the provided assistance data for later use in positioning computations.

24. The apparatus according to claim 20, wherein the at least one processing component and the at least one memory and computer program code are further configured to cause the apparatus to perform:
positioning computations based on the provided assistance data.

25. The apparatus according to claim 20, wherein the assistance data includes carrier-phase measurements on satellite signals for a reference station, wherein the at least one processing component and the at least one memory and computer program code are further configured to cause the apparatus to perform:
using the provided assistance data in determining a relative position of a satellite signal receiver to the reference station.

26. A device comprising:
an apparatus according to claim 20; and
a wireless communication component configured to enable a communication with another device.

27. A computer program product in which program code is stored in a computer readable medium, the program code realizing the following when executed by a processor:
receiving a sequence of interlinked messages comprising assistance data for a satellite signal based positioning;
providing the assistance data in the received messages for use in positioning computations;
wherein each received message includes at least one continuity indicator, the method further comprising accepting assistance data in said sequence of interlinked messages to be correct assistance data if the received sequence of interlinked messages included checking whether the assistance data to be included in a message of said sequence of interlinked messages has a desired continuity with the assistance data in a preceding message of said sequence of interlinked messages and included at least one corresponding continuity indicator in each said message.

28. The computer program product according to claim 27, wherein the messages are interlinked in that the messages are received periodically.

29. The computer program product according to claim 27, wherein the messages are interlinked in that the messages are received upon a respective request, and in that the program code when executed further generates a respective request upon receipt of a respective message of the sequence of messages.

30. An apparatus comprising:
- means for receiving a sequence of interlinked messages comprising assistance data for a satellite signal based positioning;
- means for providing the assistance data in the received messages for use in positioning computations; and
- wherein each received message includes at least one continuity indicator, further comprising means for accepting assistance data in said sequence of interlinked messages to be correct assistance data if the received sequence of interlinked messages included checking whether the assistance data to be included in a message of said sequence of interlinked messages has a desired continuity with the assistance data in a preceding message of said sequence of interlinked messages and included at least one corresponding continuity indicator in each said message.

31. A system comprising:
- an apparatus according to claim 5; and
- an apparatus comprising at least one processing component and at least one memory including computer program code, the at least one memory and the computer program code configured to, with the at least one processing component, cause the apparatus at least to perform:
- receiving a sequence of interlinked messages comprising assistance data for a satellite signal based positioning;
- providing the assistance data in the received messages for use in positioning computations; and
- wherein each received message includes at least one continuity indicator, wherein the at least one processing component and at least one memory including computer program code are further configured to cause the apparatus at least to perform accepting assistance data in said sequence of interlinked messages to be correct assistance data if the received sequence of interlinked messages included checking whether the assistance data to be included in a message of said sequence of interlinked messages has a desired continuity with the assistance data in a preceding message of said sequence of interlinked messages and included at least one corresponding continuity indicator in each said message.

* * * * *